United States Patent
Ito et al.

(10) Patent No.: US 8,251,280 B2
(45) Date of Patent: Aug. 28, 2012

(54) BAR-CODE TICKET PROCESSING APPARATUS, METHOD OF CONTROLLING BAR-CODE TICKET PROCESSING APPARATUS, AND BAR-CODE TICKET PROCESSING SYSTEM

(75) Inventors: Osamu Ito, Kawaguchi (JP); Hirofumi Ozaki, Tokyo-To (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 167 days.

(21) Appl. No.: 12/735,010

(22) PCT Filed: Dec. 10, 2007

(86) PCT No.: PCT/JP2007/073798
§ 371 (c)(1),
(2), (4) Date: Jun. 9, 2010

(87) PCT Pub. No.: WO2009/075017
PCT Pub. Date: Jun. 18, 2009

(65) Prior Publication Data
US 2010/0252621 A1     Oct. 7, 2010

(51) Int. Cl.
*G06F 17/00* (2006.01)
*G06K 9/00* (2006.01)

(52) U.S. Cl. ......... 235/375; 235/454; 235/440; 385/135

(58) Field of Classification Search .................. 235/375, 235/379, 440, 462.01–462.49; 382/135
See application file for complete search history.

(56) References Cited

U.S. PATENT DOCUMENTS
2007/0040029 A1* 2/2007 Mazowiesky ................. 235/440

FOREIGN PATENT DOCUMENTS
| JP | 07-254043 | 10/1995 |
| JP | 2002-074257 | 3/2002 |
| JP | 2005-327151 | 11/2005 |
| JP | 2006-146774 | 6/2006 |

* cited by examiner

*Primary Examiner* — Jamara Franklin
(74) *Attorney, Agent, or Firm* — Renner, Kenner, Greive, Bobak, Taylor & Weber

(57) ABSTRACT

An object of the present invention is to transmit image data of valid surfaces of all bar-code tickets to an external device by a single bar-code ticket process, regardless of orientations and directions of the bar-code tickets. A bar-code ticket processing apparatus includes a taking unit configured to take thereinto a bar-code ticket; an image-data reading unit configured to read image data of both surfaces of the bar-code ticket taken by the taking unit; a valid-surface judging unit configured to judge the surfaces of the image data read by the image-data reading unit to be valid or not; and a control unit configured to generate ticket data including the image data of a valid surface out of the image data read by the image-data reading unit, based on the judgment result of the valid-surface judging unit.

15 Claims, 11 Drawing Sheets

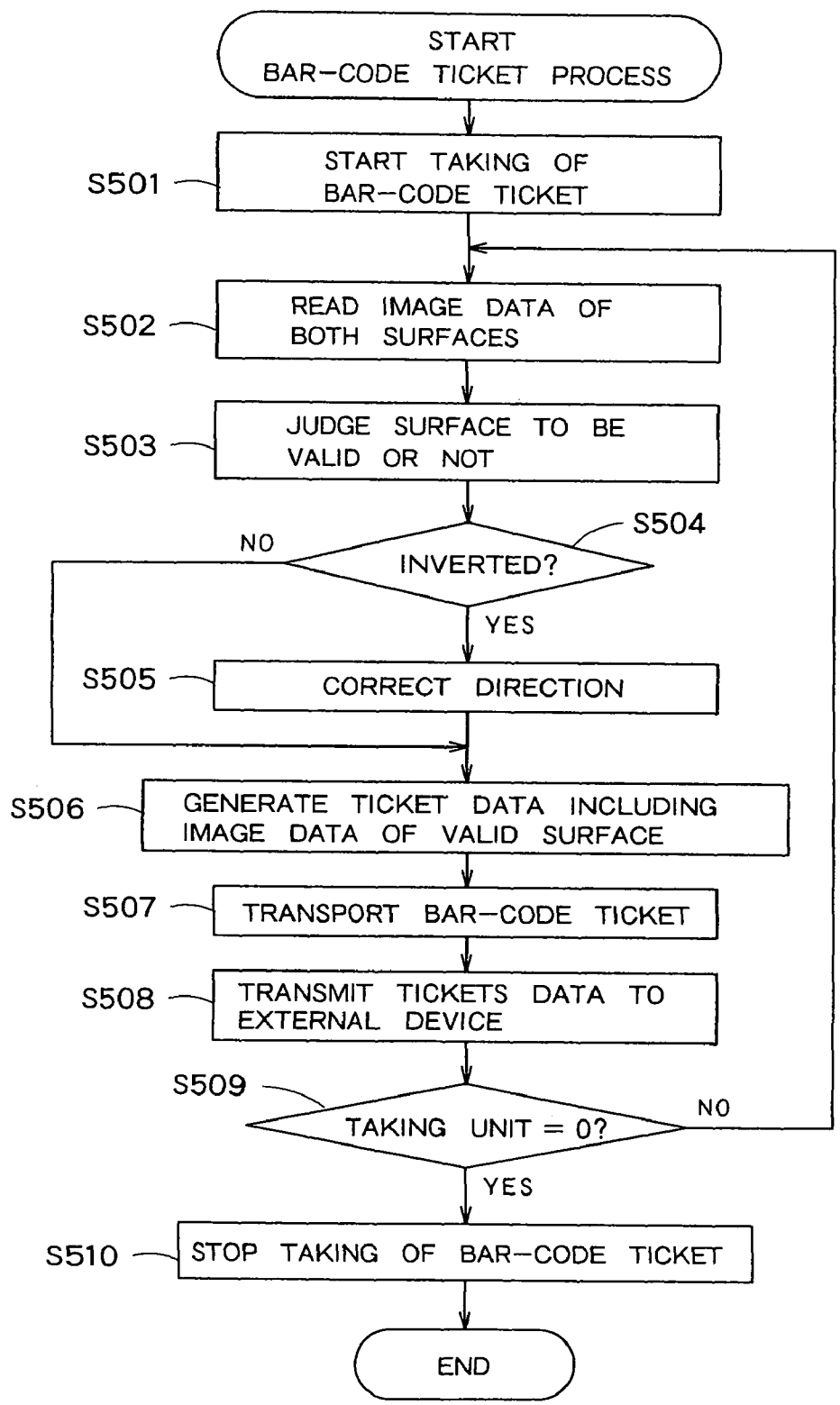
F I G. 5

| TICKET DATA No. | IMAGE DATA |
|---|---|
| TICKET DATA 1 | VN/0000000001 |
| TICKET DATA 2 | VN/0000000002 |

FIG. 6

| TICKET DATA No. | IMAGE DATA | VALID-SURFACE JUDGEMENT INFORMATION | DIRECTION JUDGEMENT INFORMATION |
|---|---|---|---|
| TICKET DATA 1 | VN/0000000001 (barcode) | VALID SURFACE | UPRIGHT |
| TICKET DATA 2 | CASINO | INVALID SURFACE | UPRIGHT |
| TICKET DATA 3 | ʐ000000000/NA (inverted, barcode) | VALID SURFACE | INVERTED |
| TICKET DATA 4 | ONISAƆ (inverted) | INVALID SURFACE | INVERTED |

F I G. 8

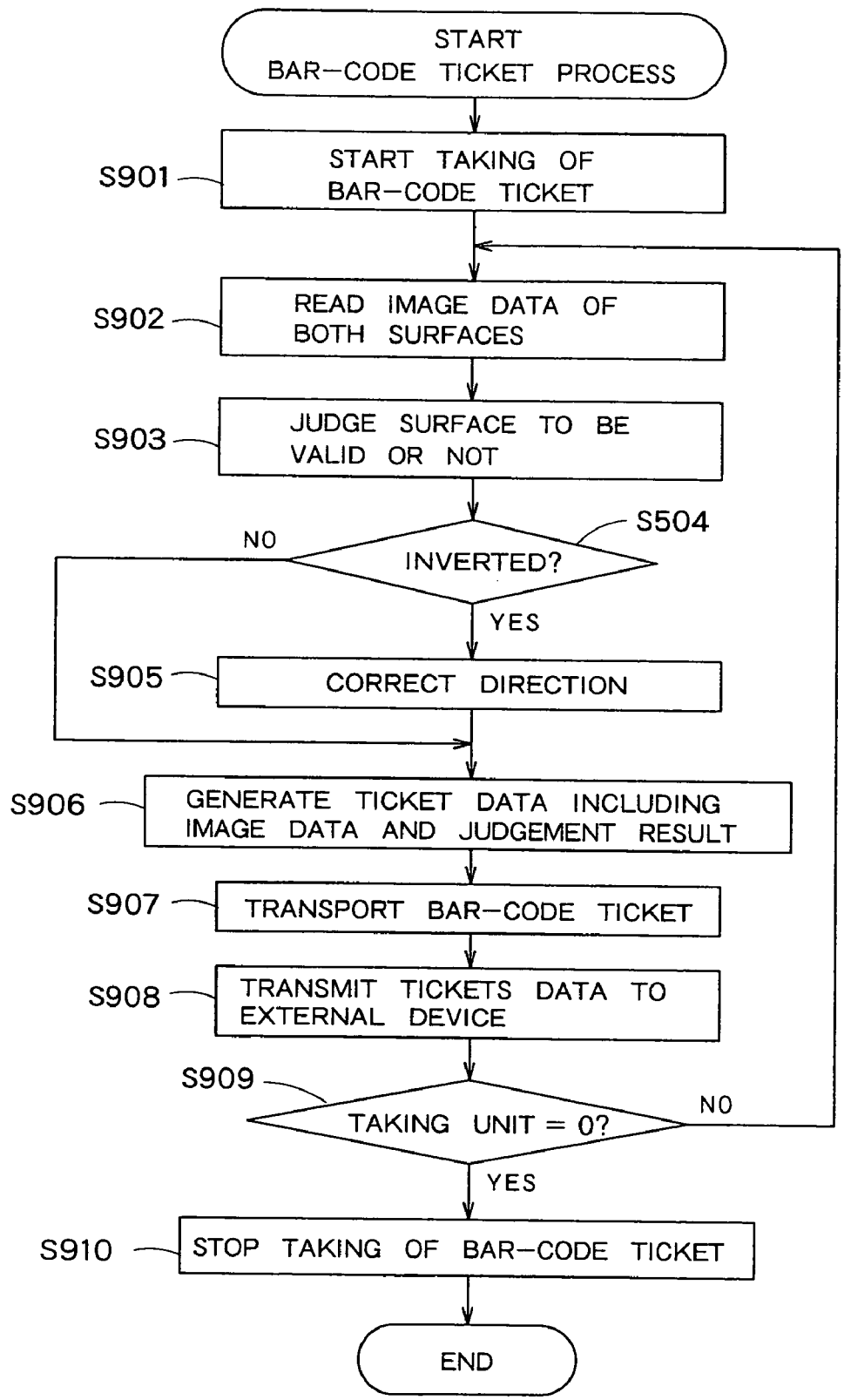
F I G. 9

| TICKET DATA No. | IMAGE DATA | VALID-SURFACE JUDGEMENT INFORMATION |
|---|---|---|
| TICKET DATA 1 | VN/0000000001 | VALID SURFACE |
| TICKET DATA 2 | CASINO | INVALID SURFACE |
| TICKET DATA 3 | VN/0000000002 | VALID SURFACE |
| TICKET DATA 4 | CASINO | INVALID SURFACE |

F I G. 10

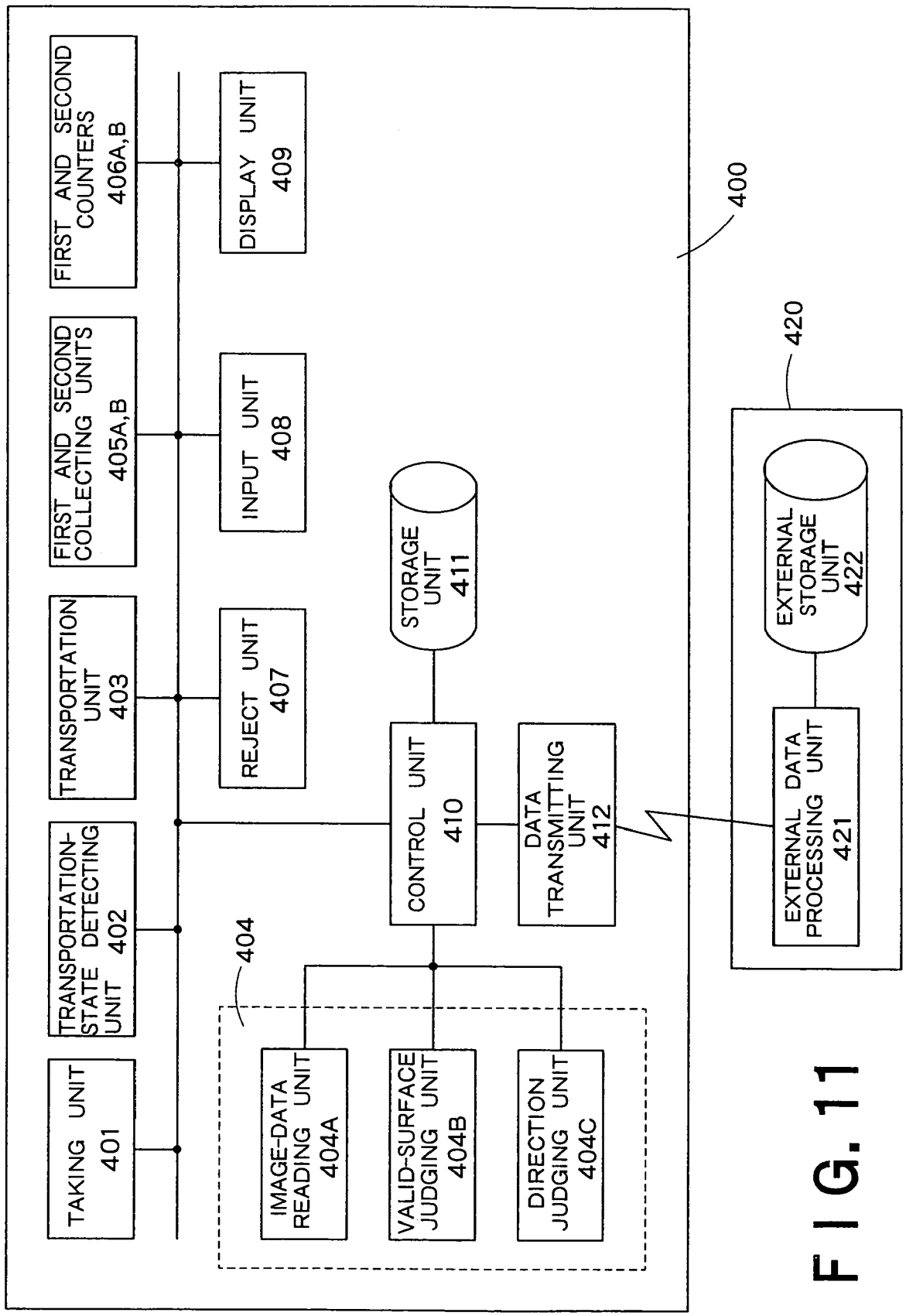
F I G. 11

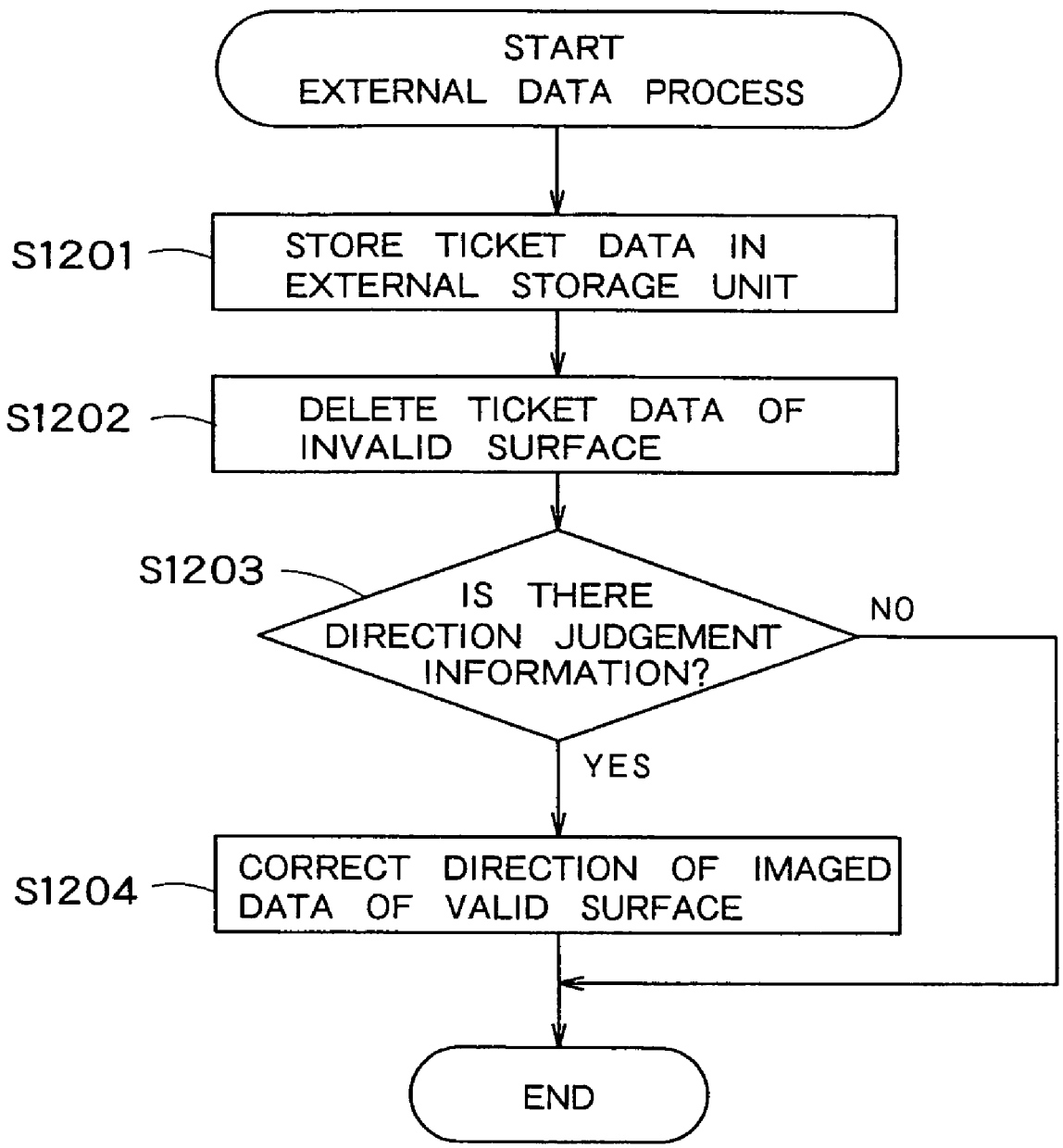
F I G. 12

BAR-CODE TICKET PROCESSING APPARATUS, METHOD OF CONTROLLING BAR-CODE TICKET PROCESSING APPARATUS, AND BAR-CODE TICKET PROCESSING SYSTEM

FIELD OF THE INVENTION

The present invention relates to a bar-code ticket processing apparatus, a method of controlling the apparatus, and a bar-code ticket processing system. In particular, the present invention relates to a bar-code ticket processing apparatus connected to an external device, a method of controlling the apparatus, and a bar-code ticket processing system.

BACKGROUND ART

In casino halls, an amusement machine (e.g., a slot machine) has been recently equipped with an apparatus for taking thereinto banknotes or bar-code tickets. When a banknote is taken thereinto, an accounting operation is performed by a banknote processing device. Meanwhile, when a bar-code ticket is taken thereinto, an accounting operation is performed by a bar-code ticket processing apparatus. Specifically, in the accounting operation of a bar-code ticket, it is sometimes required to manage image data of a bar-code ticket used by a patron. In addition, it has been recently required for an apparatus for reading image data of sheets (hereinafter referred to as "sheet processing apparatus") to process a large number of sheets at a high speed. For example, it has been required for a sheet processing apparatus to correctly read image data of several hundreds of sheets per minute.

Such a sheet processing apparatus is disclosed in JP7-244702A, JP10-269399A, and U.S. Pat. No. 7,201,320.

JP7-244702A discloses a sheet processing apparatus that reads image data of only one surface of each sheet, and transmits the image data to an external device. The external device stores the image data transmitted from the sheet processing apparatus. With the use of the stored image data, the external device performs various processes such as management of the sheets and/or judgment of validity thereof.

However, the sheet processing apparatus disclosed in JP7-244702A has the following problem. Namely, since this sheet processing apparatus reads image data of only one surface of each sheet, when all the front (reverse) surfaces of the sheets placed on a hopper unit do not face upward (downward), image data of the reverse (front) surface have to be read again. Alternatively, when the sheets to be placed on the hopper unit are manually operated by an operator such that all the front (reverse) surfaces of the sheets face upward (downward), such an operation imposes a larger burden on the operator.

On the other hand, JP10-269399A discloses a sheet processing apparatus including sensors provided above and below a transportation path, whereby image data of both surfaces of sheets transported therethrough can be read. Since this sheet processing apparatus can read image data of both surfaces of the sheets, even when all the front (reverse) surfaces of the sheets do not face upward (downward), it is not necessary to reread the image data, thereby reducing the burden imposed on the operator.

However, the sheet processing apparatus disclosed in JP10-269399A has the following problem. Namely, unless the sheets are oriented in the same direction (upright or inverted), it is difficult to manage the image data transmitted to an external device. If a mechanism for conforming the directions of sheets is provided on the apparatus, the structure of the apparatus is complicated and enlarged, resulting in increase of manufacturing cost. In addition, similarly to JP7-244702A, when the sheets to be placed are manually operated by an operator such that the all the sheets are oriented in the same direction, such an operation imposes a larger burden on the operator.

That is to say, it is difficult for the conventional techniques to solve the above problems, i.e., to correctly transmit the image data of sheets to the external device at a high speed.

DISCLOSURE OF THE INVENTION

The present invention has been made in view of the above problems. An object of the present invention is to transmit image data of valid surfaces of all bar-code tickets to an external device by a single bar-code ticket process, regardless of orientations and directions of the bar-code tickets.

Another object of the present invention is to prevent increase of a burden of an operator, who conforms the front and reverse surfaces of the sheets as well as the directions thereof, and increase of manufacturing cost of the apparatus, while facilitating management of the image data transmitted to the external device.

According to a first embodiment of the present invention, there is provided a bar-code ticket processing apparatus including: a taking unit configured to take thereinto a bar-code ticket; an image-data reading unit configured to read image data of both surfaces of the bar-code ticket taken by the taking unit; a valid-surface judging unit configured to judge the surfaces of the image data read by the image-data reading unit to be valid or not; and a control unit configured to generate ticket data including the image data of a valid surface out of the image data read by the image-data reading unit, based on the judgment result of the valid-surface judging unit.

According to a second embodiment of the present invention, there is provided the bar-code ticket processing apparatus of the first embodiment that is further including a direction judging unit configured to judge a direction of the image data read by the image-data reading unit, wherein the control unit is configured to correct the direction of the image data of the valid surface, based on the judgment result of the direction judging unit, and then generate the ticket data so as to include the corrected image data of the valid surface.

According to a third embodiment of the present invention, there is provided the bar-code ticket processing apparatus of the first embodiment that is further including a data transmitting unit configured to transmit the ticket data generated by the control unit to an external device.

According to a fourth embodiment of the present invention, there is provided a bar-code ticket processing apparatus including: a taking unit configured to take thereinto a bar-code ticket; an image-data reading unit configured to read image data of both surfaces of the bar-code ticket taken by the taking unit; a valid-surface judging unit configured to judge the surfaces of the image data read by the image-data reading unit to be valid or not; and a control unit configured to generate ticket data including the image data read by the image-data reading unit and the judgment result of the valid-surface judging unit.

According to a fifth embodiment of the present invention, there is provided the bar-code ticket processing apparatus of the fourth embodiment that is further including a direction judging unit configured to judge a direction of the image data read by the image-data reading unit, wherein the control unit is configured to generate the ticket data so as to further include the judgment result of the direction judging unit.

According to a sixth embodiment of the present invention, there is provided the bar-code ticket processing apparatus of the fourth embodiment that is further including a direction judging unit configured to judge a direction of the image data read by the image-data reading unit, wherein the control unit is configured to correct the direction of the image data, based on the judgment result of the direction judging unit, and then generate the ticket data so as to include the corrected image data.

According to a seventh embodiment of the present invention, there is provided the bar-code ticket processing apparatus of the fourth embodiment that is further including a data transmitting unit configured to transmit the ticket data generated by the control unit to an external device.

According to an eighth embodiment of the present invention, there is provided a bar-code ticket processing system including a plurality of bar-code ticket processing apparatuses configured to generate ticket data, and an external device connected to the plurality of bar-code ticket processing apparatuses and configured to manage the ticket data, wherein each of the plurality of bar-code ticket processing apparatuses includes: a taking unit configured to take thereinto a bar-code ticket; an image-data reading unit configured to read image data of both surfaces of the bar-code ticket taken by the taking unit; a valid-surface judging unit configured to judge the surfaces of the image data read by the image-data reading unit to be valid or not; a control unit configured to generate ticket data including the image data read by the image-data processing unit and the judgment result of the valid-surface judging unit; and a data transmitting unit configured to transmit the ticket data generated by the control unit to the external device; and wherein the external device includes an external data processing unit configured to process the ticket data, based on the judgment result of the valid-surface judging unit included in the ticket data which have been transmitted by the data transmitting unit of each of the plurality of bar-code ticket processing apparatuses.

According to a ninth embodiment of the present invention, there is provided the bar-code ticket processing system of the eighth embodiment wherein the bar-code ticket processing apparatus further includes a direction judging unit configured to judge a direction of the image data read by the image-data reading unit, and wherein the control unit is configured to generate the ticket data so as to further include the judgment result of the direction judging unit.

According to a tenth embodiment of the present invention, there is provided the bar-code ticket processing system of the eighth embodiment wherein the external device further includes an external storage unit configured to store the ticket data, and wherein the external data processing unit is configured to store the ticket data, which have been transmitted by the data transmitting unit of each of the plurality of bar-code ticket processing apparatuses, in the external storage unit, and then delete ticket data including the image data of an invalid surface from the external storage unit, based on the judgment result of the valid-surface judging unit.

According to an eleventh embodiment of the present invention, there is provided the bar-code ticket processing system of the ninth embodiment wherein the external device further includes an external storage unit configured to store the ticket data, and wherein the external data processing unit is configured to store the ticket data, which have been transmitted by the data transmitting unit of each of the plurality of bar-code ticket processing apparatuses, in the external storage unit, and then correct a direction of the image data of a valid surface of the ticket data stored in the external storage unit, based on the judgment result of the direction judging unit.

According to a twelfth embodiment of the present invention, there is provided a method of controlling a bar-code ticket processing apparatus, the method including: taking a bar-code ticket; reading image data of both surfaces of the bar-code ticket taken in the taking of the bar-code ticket; judging the surfaces of the image data read in reading of the image data to be valid or not; and generating ticket data including the image data of a valid surface out of the image data read in reading of the image data, based on the judgment result of the judging of the surfaces of the image data.

According to a thirteenth embodiment of the present invention, there is provided the method of controlling a bar-code ticket processing apparatus of the twelfth embodiment that is further including judging a direction of the image data read in the reading of the image data, wherein the generating of the ticket-data includes correcting the direction of the image data of the valid surface, based on the judgment result of the judging of the direction, and then generating the ticket data so as to include the corrected image data.

According to a fourteenth embodiment of the present invention, there is provided the method of controlling a bar-code ticket processing apparatus of the twelfth embodiment that is further including transmitting the ticket data generated in the generating of the ticket data to an external device.

According to a fifteenth embodiment of the present invention, there is provided a method of controlling a bar-code ticket processing apparatus, the method including: taking a bar-code ticket; reading image data of both surfaces of the bar-code ticket taken in the taking of the bar-code ticket; judging the surfaces of the image data read in the reading of the image data to be valid or not; and generating ticket data including the image data read in the reading of the image data and the judgment result of the judging of the surfaces of the image, and storing the ticket data in a storage unit.

According to a sixteenth embodiment of the present invention, there is provided the method of controlling a bar-code ticket processing apparatus of the fifteenth embodiment that is further including judging a direction of the image data read in the reading of the image data, wherein, in the generating of the ticket data, the ticket data are generated so as to further include the judgment result of the judging of the direction.

According to a seventeenth embodiment of the present invention, there is provided the method of controlling a bar-code ticket processing apparatus of the fifteenth embodiment that is further including judging a direction of the image data read in the reading of the image data, wherein the generating of the ticket data includes correcting the direction of the image data, based on the judgment result of the judging of the direction, and then generating the ticket data so as to include the corrected image data.

According to an eighteenth embodiment of the present invention, there is provided the method of controlling a bar-code ticket processing apparatus of the fifteenth embodiment that is further including transmitting the ticket data stored in the storage unit to an external device.

BRIEF DESCRIPTION OF THE DRAWINGS

FIG. 5 is a flowchart showing a process procedure of a bar-code ticket process in Example 1 of the present invention;

FIG. 6 is a schematic view showing an example of ticket data in Example 1 of the present invention;

FIG. 8 is a schematic view showing an example of ticket data in Example 2 of the present invention;

FIG. 9 is a flowchart showing a process procedure of a bar-code ticket process in Example 3 of the present invention;

FIG. 10 is a schematic view showing an example of ticket data in Example 3 of the present invention;

FIG. 11 is a block diagram showing the structure of a bar-code ticket processing apparatus 400 in Example 4 of the present invention; and FIG. 12 is a flowchart showing a process procedure of an external data process in Example 4 of the present invention.

BEST MODE FOR CARRYING OUT THE INVENTION

Herebelow, examples of the present invention will be described with reference to the drawings. The following examples are shown by way of example, and do not limit the scope of the present invention.

EXAMPLE 1

Example 1 of the present invention will be described at first. In Example 1 of the present invention, ticket data of a valid surface are transmitted.

Figure 1:
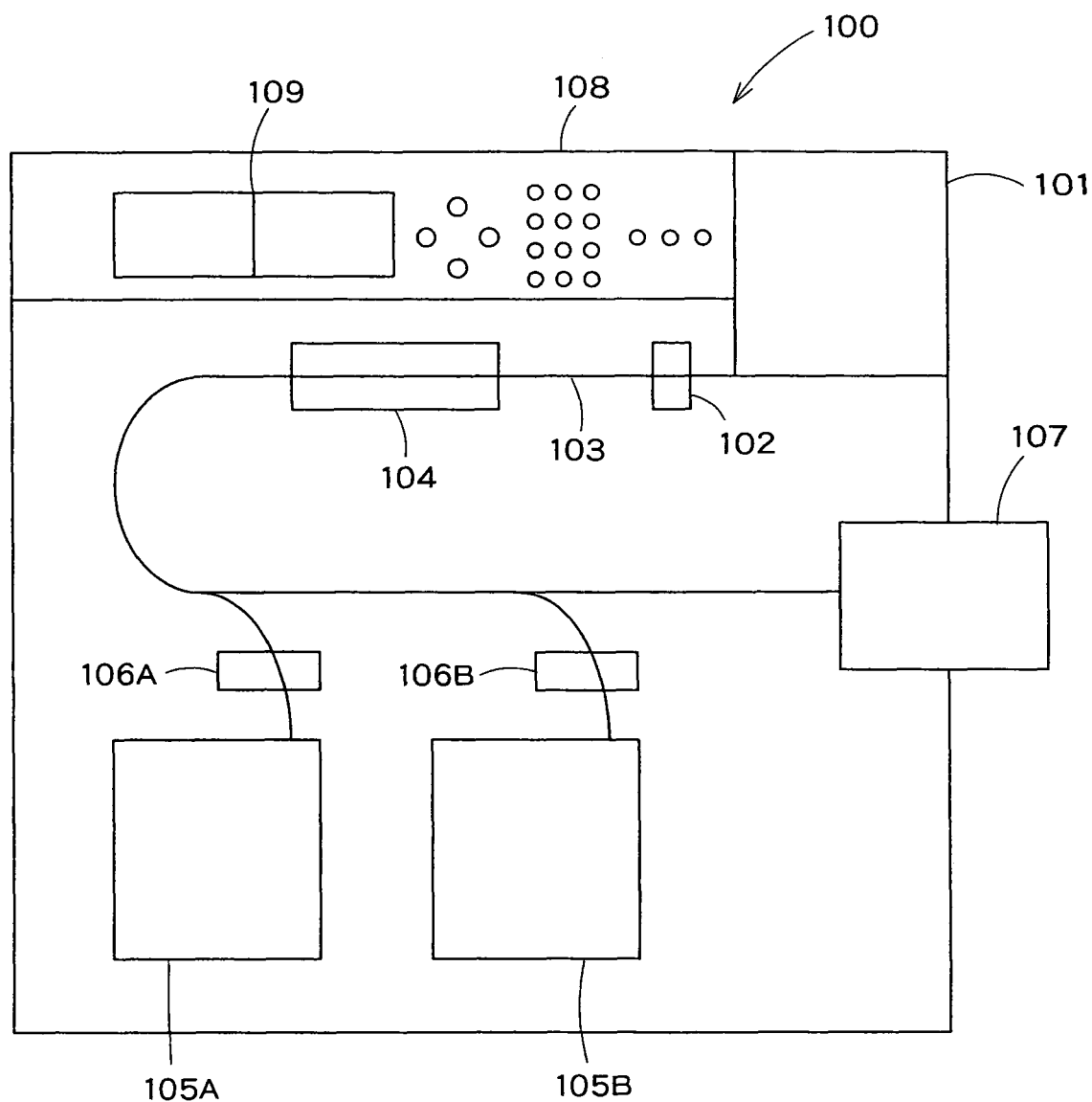
FIG. 1 is a front view showing the structure of a bar-code ticket processing apparatus 100 in Example 1 of the present invention.

FIG. 1 is a front view showing the structure of a bar-code ticket processing apparatus 100 in Example 1 of the present invention.

The bar-code ticket processing apparatus 100 in Example 1 of the present invention includes a taking unit 101, a transportation-state detecting unit 102, a transportation unit 103, a reading unit 104, a first collecting unit 105A, a second collecting unit 105B, a first counter 106A, a second counter 106B, a reject unit 107, an input unit 108, and a display unit 109. The respective units 101 to 109 are operated based on control signals outputted from a control unit 110 which is described below.

The taking unit 101 is configured to take thereinto bar-code tickets one by one from a batch (bundle) of bar-code tickets placed thereon.

The transportation-state detecting unit 102 is a sensor configured to detect a transportation state of the bar-code tickets taken by the taking unit 101. Upon detection of an abnormal transportation, the transportation-state detecting unit 102 is configured to output a abnormal-transportation signal to the control unit 110 described below. For example, when the transportation-state detecting unit 102 detects a state in which a certain bar-code ticket taken by the taking unit 101 is skewed (skewed state), another state in which bar-code tickets are taken without any predetermined intervals therebetween (chained state), or another state in which bar-code tickets are taken in an overlapped manner (overlapped state), the transportation-state detecting unit 102 outputs a abnormal-transportation signal to the control unit 110.

The transportation unit 103 is a transportation mechanism configured to transport the bar-code tickets taken by the taking unit 101 to the first collecting unit 105A, the second collecting unit 105B, or the reject unit 107. In FIG. 1, the transportation unit 103 includes a transportation path of a U-shape that is laterally arranged, a plurality of transportation belts, a plurality of transportation rollers, and a branching mechanism formed of branching claws or the like.

The reading unit 104 is disposed on a downstream side of the transportation-state detecting unit 102. The reading unit 104 is configured to read image data of both surfaces of each bar-code ticket, which has been transported by the transportation unit 103. Based on the read image data, the reading unit 104 is configured to judge the surfaces to be valid or invalid, and to judge the directions to be upright or inverted. When an abnormality occurs in reading of the image data or in judging of the surfaces and the directions, the reading unit 104 outputs an abnormal-reading signal to the control unit 110 described below. In Example 1 of the present invention, the reading unit 104 may be arranged on an upstream side of the transportation-state detecting unit 102, or may be arranged integrally with the transportation-state detecting unit 102.

The first and second collecting units 105A and 105B respectively have stackers in which the bar-code tickets, which have been transported by the transportation unit 103, can be collected. The respective stackers of the first and second collecting units 105A and 105B have openings opened to the same direction, and display panels for displaying counted results by the first and second counters 106A and 106B. The bar-code ticket processing apparatus 100 in Example 1 of the present invention may include another collecting unit, in addition to the first and second collecting units 105A and 105B.

The first and second counters 106A and 106B are respectively configured to count the number of bar-code tickets collected in the first and second collecting units 105A and 105B, and to output the counted results to the control unit 110 and the display panels of the first and second collecting units 105A and 105B.

The reject unit 107 is located at a position nearer to the taking unit 101 than the first and second collecting units 105A and 105B. Preferably, the reject unit 107 is located below the taking unit 101 and on a terminal end of the U-shaped transportation belt. The reject unit 107 is provided with openings opened in plural directions including a direction of the taking unit 101, and with movable stoppers that prevents the collected bar-code tickets from jumping out from the openings. The maximum number of bar-code tickets to be collected in the reject unit 107 is smaller than the maximum numbers thereof to be collected in the first and second collecting unit 105A and 105B.

The input unit 108 has a plurality of input keys which can be manually operated by an operator. When one of the input keys is pushed down by an operator, the input unit 108 outputs a signal indicating the pushed input key to the control unit 110.

The display unit 109 is composed of two liquid-crystal display panels for displaying a predetermined image. The display unit 109 is configured to suitably display image data outputted by the control unit 110 on the two liquid-crystal display panels.

Figure 2:
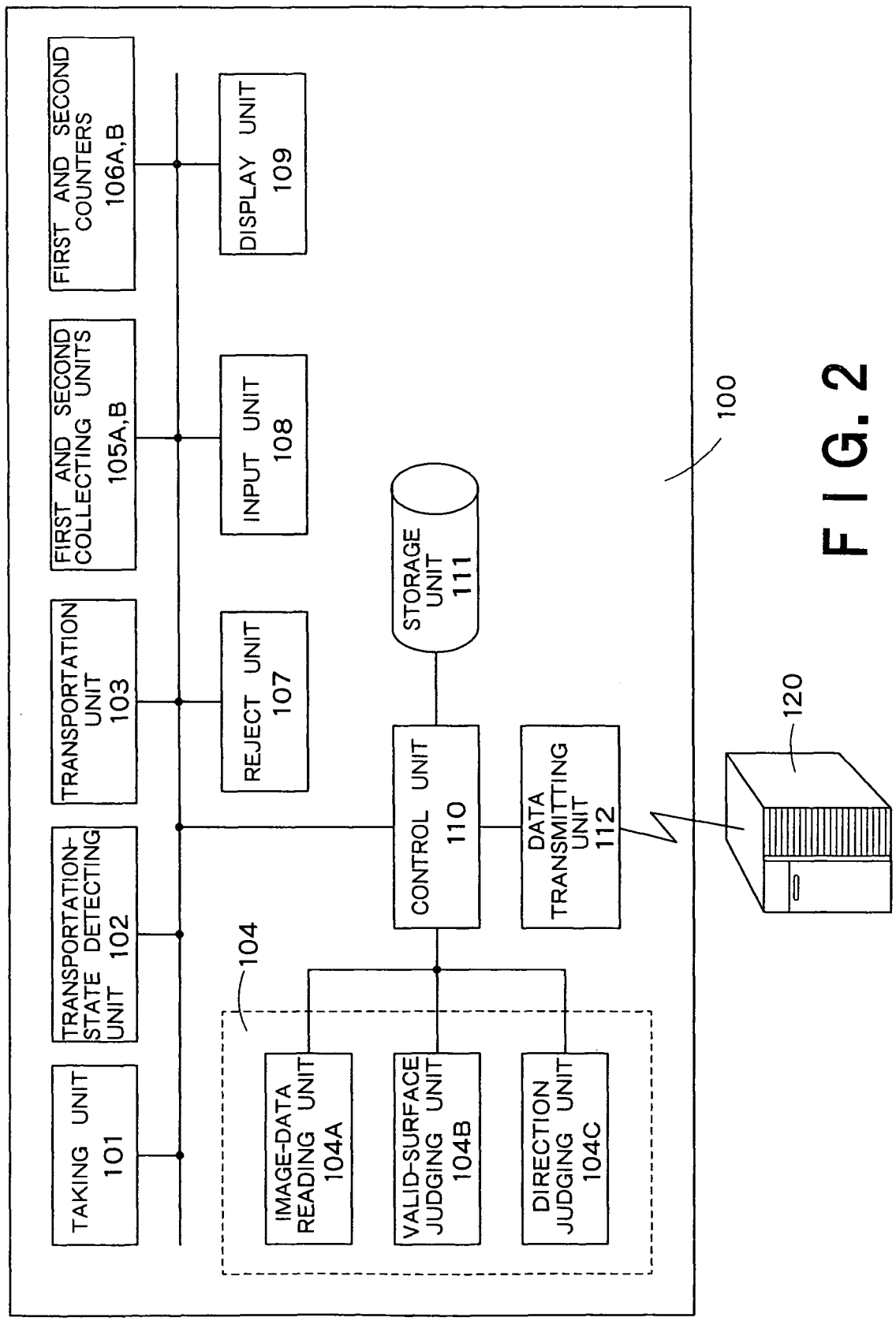
FIG. 2 is a block diagram showing the structure of the bar-code ticket processing apparatus 100 in Example 1 of the present invention.

FIG. 2 is a block diagram showing the structure of the bar-code ticket processing apparatus 100 in Example 1 of the present invention.

The bar-code ticket processing apparatus 100 in Example 1 of the present invention further includes the control unit 110, a storage unit 111, and a data transmitting unit 112, in addition to the respective units 101 to 109 shown in FIG. 1.

The control unit 110 is connected to the respective units 101 to 109, 111, and 112. The control unit 110 is configured to output control signals to the respective units 101 to 109, 111, and 112 so as to control operations thereof. Further, the control unit 110 is configured to output image data to the display unit 109. Furthermore, the control unit 110 is configured to generate ticket data described below.

An image-data reading unit 104A is configured to read image data of both surfaces of each bar-code ticket taken by the taking unit 101, and to output the read image data to the control unit 110. For example, the image-data reading unit 104A is composed of a pair of line scanners arranged above and below the transportation path.

A valid-surface judging unit 104B is configured to judge, based on the image data of both surfaces read by the image-data reading unit 104A, whether the surfaces of the image data are valid or invalid, and to output the judgment result (hereinafter referred to as "valid-surface judgment information") to the control unit 110. For example, the valid-surface judging unit 104B judges the surface of the image data to be valid or invalid, depending on a presence of the bar code.

A direction judging unit 104C is configured to judge, based on the image data of both surfaces read by the image-data reading unit 104A, whether the directions of the valid and invalid surfaces of the image data are upright or inverted, and to output the judgment result (hereinafter referred to as "direction judgment information") to the control unit 110. For example, the direction judging unit 104C judges the direction of the image data to be upright or inverted, depending on a printed position of the bar code.

The storage unit 111 is configured to store a control program of the control unit 110, counted results of the first and second counters 106A and 106B, and image data to be displayed on the display unit 109.

The data transmitting unit 112 is connected to an external device 120. The data transmitting unit 112 is configured to transmit the ticket data outputted by the control unit 110 to the external device 120.

The external device 120 is connected to the bar-code ticket processing apparatus in Example 1 of the present invention. The external device 120 is configured to manage the ticket data transmitted by the bar-code ticket processing apparatus 100.

FIG. 3 is a schematic view showing an example of a reading result read by the image-data reading unit 104A.

Figure 3A:
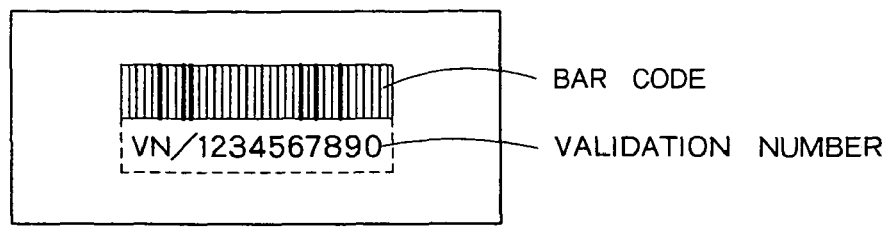
FIG. 3 is a schematic view showing an example of a reading result read by an image-data reading unit 104A.
Figure 3B:
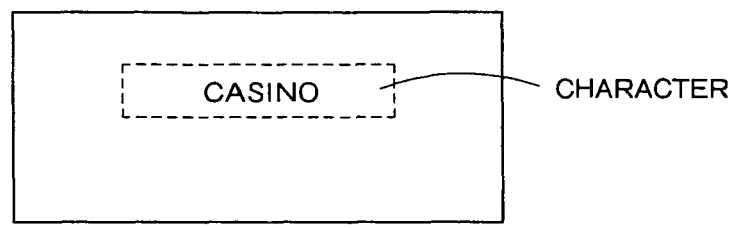

The image-data reading unit 104A reads image data of the front surface including a bar code and identification information (hereinafter referred to as "validation numbers") represented by the bar code, which is shown in FIG. 3A, and image data of the reverse surface including predetermined characters (e.g., shop name where the bar-code ticket is used), which is shown in FIG. 3B.

The valid-surface judging unit 104B judges the surface on which the bar code is printed, as shown in FIG. 3A, to be valid, and judges the surface on which no bar code is printed, as shown in FIG. 3B, to be invalid. The valid-surface judging unit 104B may read a character printed on the bar-code ticket and judge whether the surface is valid or invalid, based on the read character. Alternatively, the valid-surface judging unit 104B may read a figure printed on the bar-code ticket and judge whether the surface is valid or invalid, based on a certain feature of the read figure.

FIG. 4 is a schematic view showing an example of the direction judgment.

Figure 4A:
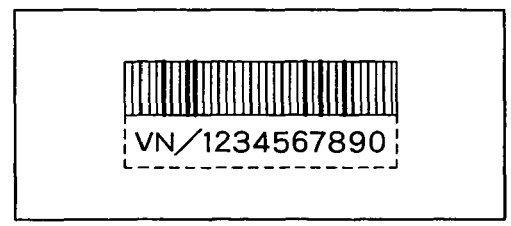
FIG. 4 is a schematic view showing an example of a direction judgment.
Figure 4B:
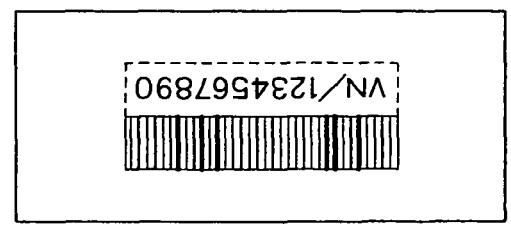

As shown in FIG. 4A, when the bar code is positioned above the validation numbers, the direction judging unit 104C judges the direction to be upright. On the other hand, when the bar code is positioned below the validation numbers, the direction judging unit 104C judges the direction to be inverted. The direction judging unit 104C may read a character printed on the bar-code ticket and judge whether the direction is upright or inverted, based on the read character. Alternatively, the direction judging unit 104C may read a figure printed on the bar-code ticket and judge whether the direction is upright or inverted, based on a certain feature of the read figure.

When the direction judgment information shows that the bar-code ticket is inverted (i.e., image data shown in FIG. 4B), the control unit 110 corrects the image data by rotating the same by 180 degrees so as to obtain the image data shown in FIG. 4A, and generates ticket data including the corrected image data.

FIG. 5 is a flowchart showing a process procedure of a bar-code ticket process in Example 1 of the present invention.

The bar-code ticket process in Example 1 of the present invention is carried out by the respective units 101 to 109, 111, and 112 of the bar-code ticket processing apparatus 100, which are operated based on control signals outputted by the control unit 110.

At first, the taking unit 101 starts to take thereinto a batch of bar-code tickets placed thereon (S501).

Then, the image-data reading unit 104A reads image data of both surfaces of the respective bar-code tickets, which have been taken by the taking unit 101, and outputs the read image data to the control unit 110 (S502).

Then, based on the image data read by the image-data reading unit 104A in the step S502, the valid-surface judging unit 104B judges whether the surfaces are valid or invalid, and outputs the valid-surface judgment information to the control unit 110 (S503).

Then, when the direction judgment information shows that the direction of a certain bar-code ticket is inverted (S504-YES), the control unit 110 corrects the direction of the image data of the valid surface (S505), among the image data outputted in the step S502. On the other hand, when the direction judgment information shows that the directions of the bar-code tickets are upright (S504-NO), the process proceeds to a step S506.

Then, the control unit 110 generates ticket data including the image data of the valid surfaces which have been read in the step S502, or the ticket data including the image data of the valid surfaces which have been corrected in the step S505 (S506). Thereafter, the control unit 110 outputs the ticket data to the data transmitting unit 112.

Then, the transportation unit 103 transports the bar-code tickets, which have been taken by the taking unit 101, to the first collecting unit 105A or the second collecting unit 105B (S507). In Example 1 of the present invention, when the transportation-state detecting unit 102 detects an abnormal transportation, or when any one of the respective units 104A to 104C of the reading unit 104 has an abnormality in reading of the bar-code tickets, the transportation unit 103 may transport the bar-code tickets to the reject unit 107.

Then, the data transmitting unit 112 transmits the ticket data outputted by the control unit 110 to the external device 120 (S508).

The steps S502 to S508 are repeated until all the bar-code tickets placed on the taking unit 101 are taken by the taking unit 101 (S509-NO). When there remains no bar-code ticket on the taking unit 101 (S509-YES), the taking unit 101 stops the taking operation which was started in the step S501 (S510).

The bar-code ticket process in Example 1 of the present invention is terminated after the step S510.

FIG. 6 is a schematic view showing an example of ticket data in Example 1 of the present invention.

As shown in FIG. 6, the control unit 110 generates ticket data including items of "Ticket Data Number" and "Image Data" in the step S506 of FIG. 5. The image data of the respective ticket data correspond to the valid surfaces of the bar-code tickets, and the directions thereof are the same (upright). The ticket data 1 represent ticket data of the bar-code ticket which has been firstly taken, and the ticket data 2 represent ticket data of the bar-code ticket which has been secondly taken.

According to Example 1 of the present invention, the control unit 110 generates ticket data including image data of valid surfaces, and transmits the ticket data to the external device 120. Thus, regardless of the orientations and directions of the bar-code tickets, only the image data of the bar-code tickets showing the valid surfaces can be transmitted to the external device 120 by a single bar-code ticket process.

In addition, according to Example 1 of the present invention, the direction of image data is corrected based on the direction judgment information, and the ticket data including the corrected image data are generated. Thus, the image data of the valid surfaces which are oriented in the same (upright) direction can be transmitted to the external device 120, without the aid of a manual operation of an operator or any mechanism of the device. As a result, increase of a burden of an operator and increase of manufacturing cost of the device can be prevented, while management of the image data transmitted to the external device 120 can be facilitated.

EXAMPLE 2

Next, Example 2 of the present invention will be described. In Example 1, ticket data including image data of a valid surface are transmitted. On the other hand, in Example 2, ticket data including image data, valid-surface judgment information, and direction judgment information, are transmitted. Part of description of Example 2 that is repeating that of Example 1 and 2 is omitted.

Figure 7:
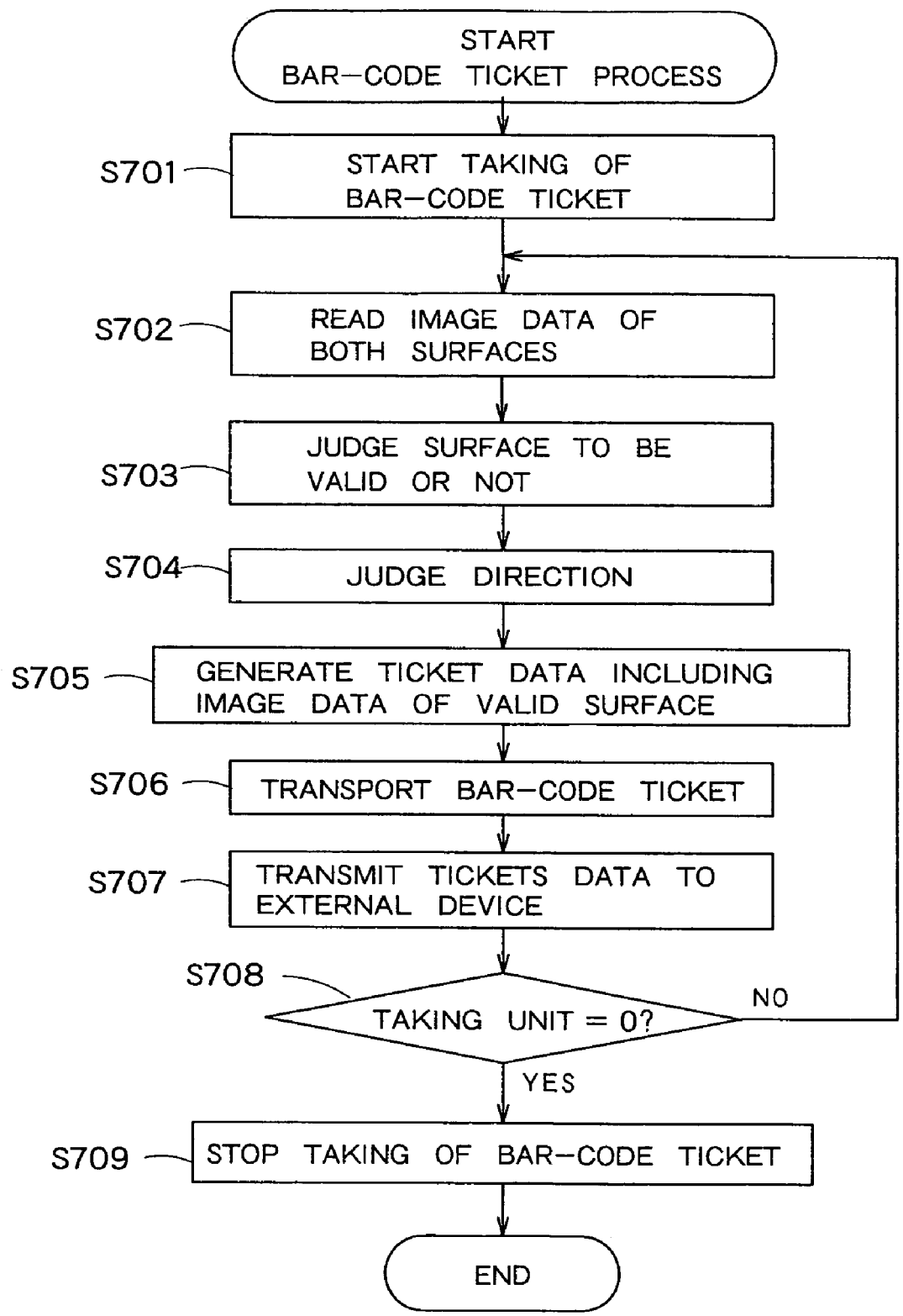
FIG. 7 is a flowchart showing a process procedure of a bar-code ticket process in Example 2 of the present invention.

FIG. 7 is a flowchart showing a process procedure of a bar-code ticket process in Example 2 of the present invention.

The bar-code ticket process in Example 2 of the present invention is carried out by the respective units 101 to 109, 111, and 112 of the bar-code ticket processing apparatus 100, which are operated based on control signals outputted by the control unit 110.

At first, the taking unit 101 starts to take thereinto a batch of bar-code tickets placed thereon (S701).

Then, the image-data reading unit 104A reads image data of both surfaces of the respective bar-code tickets, which have been taken by the taking unit 101, and outputs the read image data to the control unit 110 (S702).

Then, based on the image data read by the image-data reading unit 104A in the step S702, the valid-surface judging unit 104B judges whether the surfaces are valid or invalid, and outputs the valid-surface judgment information to the control unit 110 (S703).

Then, based on the image data read by the image-data reading unit 104A in the step S702, the direction judging unit 104C judges whether the directions are upright or inverted, and outputs the direction judgment information to the control unit 110 (S704).

Then, the control unit 110 generates ticket data including the image data, which have been read in the step S702, the valid-surface judgment information, which has been outputted in the step S703, and the direction judgment information, which has been outputted in the step S704 (S705). Thereafter, the control unit 110 outputs the ticket data to the data transmitting unit 112.

Then, the transportation unit 103 transports the bar-code tickets, which have been taken by the taking unit 101, to the first collecting unit 105A or the second collecting unit 105B (S706). In Example 2 of the present invention, when the transportation-state detecting unit 102 detects an abnormal transportation, the transportation unit 103 may transport the bar-code tickets to the reject unit 107.

Then, the data transmitting unit 112 transmits the ticket data outputted by the control unit 110 to the external device 120 (S707).

The steps S702 to S707 are repeated until all the bar-code tickets placed on the taking unit 101 are taken by the taking unit 101 (S708-NO). When there remains no bar-code ticket on the taking unit 101 (S708-YES), the taking unit 101 stops the taking operation which was started in the step S701 (S709).

The bar-code ticket process in Example 2 of the present invention is terminated after the step S709.

FIG. 8 is a schematic view showing an example of ticket data in Example 2 of the present invention.

As shown in FIG. 8, the control unit 110 generates ticket data including items of "Ticket Data Number", "Image Data", "Valid-Surface Judgment Information", and "Direction Judgment Information" in the step S705 of FIG. 7. In the image data of the respective ticket data, the valid surfaces of the bar-code tickets may face upward or downward, and the directions thereof may be different (upright and inverted). The ticket data 1 and 2 represent ticket data of the bar-code ticket which has been firstly taken, and the ticket data 3 and 4 represent ticket data of the bar-code ticket which has been secondly taken.

According to Example 2 of the present invention, the ticket data containing the image data, the valid-surface judgment information and the direction judgment information, and the ticket data are generated and transmitted to the external device 120. Therefore, management of the image data transmitted to the external device 120 can be facilitated. In particular, when the valid-surface judgment information shows that a surface of a certain bar-code ticket is invalid, the external device 120 can delete the image data of the invalid surface. In addition, the external device 120 can correct the direction of the image data, based on the direction judgment information.

EXAMPLE 3

Next, Example 3 of the present invention will be described. In Example 2, the ticket data including the image data, the valid-surface judgment information, and the direction judgment information are transmitted. On the other hand, in Example 3, the direction of image data is corrected, and then ticket data including the corrected image data and the valid-surface judgment information are transmitted. Part of description of Example 3 that is repeating those of Examples 1 and 2 is omitted.

FIG. 9 is a flowchart showing a process procedure of a bar-code ticket process in Example 3 of the present invention.

The bar-code ticket process in Example 3 of the present invention is carried out by the respective units 101 to 109, 111, and 112 of the bar-code ticket processing apparatus 100, which are operated based on control signals outputted by the control unit 110.

At first, the taking unit 101 starts to take thereinto a bundle of bar-code tickets paled thereon (S901).

Then, the image-data reading unit 104A reads image data of both surfaces of the respective bar-code tickets, which have been taken by the taking unit 101, and outputs the read image data to the control unit 110 (S902).

Then, based on the image data read by the image-data reading unit 104A in the step S902, the valid-surface judging unit 104B judges whether the surfaces are valid or invalid, and outputs the valid-surface judgment information to the control unit 110 (S903).

Then, when the direction judgment information shows that the direction of a certain bar-code ticket is inverted (S904-YES), the control unit 110 corrects the direction of the image data outputted in the step S902 (S905). On the other hand, when the direction judgment information shows that the directions of the bar-code tickets are upright (S904-NO), the process proceeds to a step S906.

Then, the control unit 110 generates ticket data including the image data which have been read in the step S902, or the image data which have been corrected in the step S905, and the valid-surface judgment information which has been outputted in the step S903 (S906). Thereafter, the control unit 110 outputs the ticket data to the data transmitting unit 112.

Then, the transportation unit 103 transports the bar-code tickets, which have been taken by the taking unit 101, to the first collecting unit 105A or the second collecting unit 105B (S907). In Example 3 of the present invention, when the transportation-state detecting unit 102 detects an abnormal transportation, or when any one of the respective units 104A to 104C of the reading unit 104 has an abnormality in reading of the bar-code tickets, the transportation unit 103 may transport the bar-code tickets to the reject unit 107.

Then, the data transmitting unit 112 transmits the ticket data outputted by the control unit 110 to the external device 120 (S908).

The steps S902 to S908 are repeated until all the bar-code tickets placed on the taking unit 101 are taken by the taking unit 101 (S909-NO). When there remains no bar-code ticket on the taking unit 101 (S909-YES), the taking unit 101 stops the taking operation which was started in the step S901 (S910).

The bar-code ticket process in Example 3 of the present invention is terminated after the step S910.

FIG. 10 is a schematic view showing an example of ticket data in Example 3 of the present invention.

As shown in FIG. 10, the control unit 110 generates ticket data including items of "Ticket Data Number", "Image Data", and "Valid-Surface Judgment Information" in the step S906 of FIG. 9. In the image data of the respective ticket data, the valid surfaces of the bar-code tickets may face upward or downward, while the directions thereof are the same (upright). The ticket data 1 and 2 represent ticket data of the bar-code ticket which has been firstly taken, and the ticket data 3 and 4 represent ticket data of the bar-code ticket which has been secondly taken.

According to Example 3 of the present invention, the direction of image data is corrected based on the direction judgment information, then the ticket data containing the corrected image data and the valid-surface judgment information and the ticket data are generated and transmitted to the external device 120. Therefore, management of the image data transmitted to the external device 120 can be facilitated. In particular, when the valid-surface judgment information shows that a surface of a certain bar-code ticket is invalid, the external device 120 can delete the image data of the invalid surface.

EXAMPLE 4

Next, Example 4 of the present invention will be described. In Example 1, the ticket data of a valid surface is transmitted. On the other hand, in Example 4, an external device processes ticket data transmitted thereto by a bar-code ticket processing apparatus. Part of description of Example 4 that is repeating those of Examples 1 to 3 is omitted.

FIG. 11 is a block diagram showing the structure of a bar-code ticket processing apparatus 400 in Example 4 of the present invention.

The bar-code ticket processing apparatus 400 in Example of the present invention includes a taking unit 401, a transportation-state detecting unit 402, a transportation unit 403, a first collecting unit 405A, a second collecting unit 405B, a first counter 406A, a second counter 406B, a reject unit 407, an input unit 408, and a display unit 409, which are similar to those shown in FIG. 1. Further, the bar-code ticket processing apparatus 400 includes a control unit 410, a storage unit 411, and a data transmitting unit 412.

The control unit 410 is connected to the respective units 401 to 409, 411, and 412. The control unit 410 is configured to output control signals to the respective units 401 to 409, 411, and 412 so as to control operations thereof. Further, the control unit 410 is configured to output image data to the display unit 409. Furthermore, the control unit 410 is configured to generate ticket data described below.

An image-data reading unit 404A is configured to read image data of both surfaces of the bar-code ticket taken by the taking unit 401, and to output the read image data to the control unit 410. For example, the image-data reading unit 404A is composed of a pair of line scanners arranged above and below a transportation path.

Based on the image data of both surfaces read by the image-data reading unit 404A, a valid-surface judging unit 404B is configured to judge whether the surfaces of the image data are valid or invalid, and to output the judgment result (hereinafter referred to as "valid-surface judgment information") to the control unit 410. For example, the valid-surface judging unit 404B judges the surface of image data to be valid or invalid, depending on a presence of the bar code.

Based on the image data of both surfaces read by the image-data reading unit 404A, a direction judging unit 404C is configured to judge whether the directions of the valid and invalid surfaces of the image data are upright or inverted, and to output the judgment result (hereinafter referred to as "direction judgment information") to the control unit 410. For example, the direction judging unit 404C judges the direction of image data to be upright or inverted, depending on a printed position of the bar code.

The storage unit 411 is configured to store a control program of the control unit 410, counted results of the first and second counters 406A and 406B, and image data to be displayed on the display unit 409.

The data transmitting unit 412 is connected to an external data processing unit 421 of an external device 420. The data transmitting unit 412 is configured to transmit the ticket data outputted by the control unit 410 to the external data processing unit 421 of the external device 420.

The external device 420 includes the external data processing unit 421 and an external storage unit 422.

The external data processing unit 421 is configured to store the ticket data, which have been transmitted by the data transmitting unit 421 of the bar-code ticket processing apparatus 400, in the external storage unit 422. In addition, the external data processing unit 421 performs an external data process described below.

The external storage unit 422 is configured to store a control program of the external data processing unit 421 and the ticket data stored by the external data processing unit 421.

Since the bar-code ticket process in Example 4 of the present invention is the same as the bar-code ticket process in Example 2 or 3 (FIG. 7 or 9) of the present invention, description thereof is omitted.

FIG. 12 is a flowchart showing a process procedure of external data process in Example 4 of the present invention.

The external data process in Example 4 of the present invention is carried out by the external data processing unit 421.

At first, the external data processing unit 421 stores the ticket data, which have been transmitted by the data transmitting unit 412 of the bar-code ticket processing apparatus, in the external storage unit 422 (S1201). The ticket data stored in the external storage unit 422 at this time are the same as the ticket data in Example 2 or 3 (FIG. 8 or 10) of the present invention.

Then, based on the valid-surface judgment information of the ticket data stored in the external storage unit 422 in the step S1201, the external data processing unit 421 deletes the ticket data of an invalid surface from the external storage unit 422 (S1202). For example, in the example shown in FIG. 8 or 10, the ticket data 2 and 4 are deleted. At this time, the external data processing unit 421 may delete the valid-surface judgment information included in the ticket data of a valid surface left in the external storage unit 422.

As shown in FIG. 8, when direction judgment information is included in the ticket data (S1203-YES), the external data processing unit 421 corrects the direction of the image data of the ticket data of a valid surface stored in the external storage unit 422 (S1204). At this time, the external data processing unit 421 may delete the direction judgment information included in the ticket data of the valid surface left in the external storage unit 422.

The external data process in Example 4 of the present invention is terminated after the step S1204, or when no direction judgment information is included in the ticket data, as shown in FIG. 10 (S1203-NO).

According to Example 4 of the present invention, in the bar-code ticket processing apparatus 400, the ticket data containing the image data, the valid-surface judgment information and the direction judgment information are generated. Meanwhile, in the external device 420, there is performed the external data process, based on the valid-surface judgment information and the direction judgment information included in the ticket data, which have been transmitted by the bar-code ticket processing apparatus 400. Therefore, it is easy to extract image data of valid surfaces, and to conform the directions of the extracted image data to each other.

The invention claimed is:

1. A bar-code ticket processing apparatus comprising:
   a taking unit configured to take thereinto a bar-code ticket;
   an image-data reading unit configured to read image data of both surfaces of the bar-code ticket taken by the taking unit;
   a valid-surface judging unit configured to judge the surfaces of the image data read by the image-data reading unit to be valid or not;
   a control unit configured to generate ticket data including the image data of a valid surface out of the image data read by the image-data reading unit, based on the judgment result of the valid-surface judging unit; and
   a direction judging unit configured to judge a direction of the image data read by the image-data reading unit,
   wherein the control unit is configured to correct the direction of the image data of the valid surface, based on the judgment result of the direction judging unit, and then generate the ticket data so as to include the corrected image data of the valid surface.

2. The bar-code ticket processing apparatus according to claim 1, further comprising a data transmitting unit configured to transmit the ticket data generated by the control unit to an external device.

3. A bar-code ticket processing apparatus comprising:
   a taking unit configured to take thereinto a bar-code ticket;
   an image-data reading unit configured to read image data of both surfaces of the bar-code ticket taken by the taking unit;
   a valid-surface judging unit configured to judge the surfaces of the image data read by the image-data reading unit to be valid or not;
   a control unit configured to generate ticket data including the image data read by the image-data reading unit and the judgment result of the valid-surface judging unit; and
   a direction judging unit configured to judge a direction of the image data read by the image-data reading unit,
   wherein the control unit is configured to generate the ticket data so as to further include the judgment result of the direction judging unit.

4. The bar-code ticket processing apparatus according to claim 3, further comprising a data transmitting unit configured to transmit the ticket data generated by the control unit to an external device.

5. A bar-code ticket processing apparatus comprising:
   a taking unit configured to take thereinto a bar-code ticket;
   an image-data reading unit configured to read image data of both surfaces of the bar-code ticket taken by the taking unit;
   a valid-surface judging unit configured to judge the surfaces of the image data read by the image-data reading unit to be valid or not;
   a control unit configured to generate ticket data including the image data read by the image-data reading unit and the judgment result of the valid-surface judging unit; and
   a direction judging unit configured to judge a direction of the image data read by the image-data reading unit,
   wherein the control unit is configured to correct the direction of the image data, based on the judgment result of the direction judging unit, and then generate the ticket data so as to include the corrected image data.

6. The bar-code ticket processing apparatus according to claim 5, further comprising a data transmitting unit configured to transmit the ticket data generated by the control unit to an external device.

7. A bar-code ticket processing system comprising a plurality of bar-code ticket processing apparatuses configured to generate ticket data, and an external device connected to the plurality of bar-code ticket processing apparatuses and configured to manage the ticket data,
   wherein each of the plurality of bar-code ticket processing apparatuses comprises:
   a taking unit configured to take thereinto a bar-code ticket;
   an image-data reading unit configured to read image data of both surfaces of the bar-code ticket taken by the taking unit;
   a valid-surface judging unit configured to judge the surfaces of the image data read by the image-data reading unit to be valid or not;
   a control unit configured to generate ticket data including the image data read by the image-data processing unit and the judgment result of the valid-surface judging unit;
   a data transmitting unit configured to transmit the ticket data generated by the control unit to the external device; and a direction judging unit configured to judge a direction of the image data read by the image-data reading unit;

wherein the external device comprises an external data processing unit configured to process the ticket data, based on the judgment result of the valid-surface judging unit included in the ticket data which have been transmitted by the data transmitting unit of each of the plurality of bar-code ticket processing apparatuses, and wherein the control unit is configured to generate the ticket data so as to further include the judgment result of the direction judging unit.

8. The bar-code ticket processing system according to claim 7, wherein the external device further comprises an external storage unit configured to store the ticket data, and wherein the external data processing unit is configured to store the ticket data, which have been transmitted by the data transmitting unit of each of the plurality of bar-code ticket processing apparatuses, in the external storage unit, and then delete ticket data including the image data of an invalid surface from the external storage unit, based on the judgment result of the valid-surface judging unit.

9. The bar-code ticket processing system according to claim 7, wherein the external device further comprises an external storage unit configured to store the ticket data, and wherein the external data processing unit is configured to store the ticket data, which have been transmitted by the data transmitting unit of each of the plurality of bar-code ticket processing apparatuses, in the external storage unit, and then correct a direction of the image data of a valid surface of the ticket data stored in the external storage unit, based on the judgment result of the direction judging unit.

10. A method of controlling a bar-code ticket processing apparatus, the method comprising:

taking a bar-code ticket;

reading image data of both surfaces of the bar-code ticket taken in the taking of the bar-code ticket;

judging the surfaces of the image data read in the reading of the image data to be valid or not;

generating ticket data including the image data of a valid surface out of the image data read in the reading of the image data, based on the judgment result of the judging of the surfaces of the image data; and judging a direction of the image data read in the reading of the image data, wherein the generating of the ticket-data includes correcting the direction of the image data of the valid surface, based on the judgment result of the judging of the direction, and then generating the ticket data so as to include the corrected image data.

11. The method of controlling a bar-code ticket processing apparatus according to claim 10, further comprising transmitting the ticket data generated in the generating of the ticket data to an external device.

12. A method of controlling a bar-code ticket processing apparatus, the method comprising:

taking a bar-code ticket;

reading image data of both surfaces of the bar-code ticket taken in the taking of the bar-code ticket;

judging the surfaces of the image data read in the reading of the image data to be valid or not;

generating ticket data including the image data read in the reading of the image data and the judgment result of the judging of the surfaces of the image, and storing the ticket data in a storage unit; and judging a direction of the image data read in the reading of the image data, wherein, in the generating of the ticket data, the ticket data are generated so as to further include the judgment result of the judging of the direction.

13. The method of controlling a bar-code ticket processing apparatus according to claim 12, further comprising transmitting the ticket data stored in the storage unit to an external device.

14. A method of controlling a bar-code ticket processing apparatus, the method comprising:

taking a bar-code ticket;

reading image data of both surfaces of the bar-code ticket taken in the taking of the bar-code ticket;

judging the surfaces of the image data read in the reading of the image data to be valid or not;

generating ticket data including the image data read in the reading of the image data and the judgment result of the judging of the surfaces of the image, and storing the ticket data in a storage unit; and judging a direction of the image data read in the reading of the image data, wherein the generating of the ticket data includes correcting the direction of the image data, based on the judgment result of the judging of the direction, and then generating the ticket data so as to include the corrected image data.

15. The method of controlling a bar-code ticket processing apparatus according to claim 14, further comprising transmitting the ticket data stored in the storage unit to an external device.

* * * * *